United States Patent [19]
Sugiura et al.

[11] 3,791,833
[45] Feb. 12, 1974

[54] CERAMIC COMPOSITION

[76] Inventors: Masatoshi Sugiura, 2, Jodoji Minamida-cho, Sakyo-ku, Kyoto; Masaya Hirabayashi, 6, Shironoue, Kotari, Nagaoka-cho, Otokuni-gun, Kyoto; Yosimasa Goto, c/o Kyoto Ceramic Co., Ltd., 101 Hara-machi, Nishinokyo Nakagyo-ku, Kyoto, all of Japan

[22] Filed: Jan. 27, 1972

[21] Appl. No.: 221,267

Related U.S. Application Data

[63] Continuation-in-part of Ser. No. 864,178, Oct. 6, 1969, abandoned.

[30] Foreign Application Priority Data
Oct. 18, 1968  Japan.............................. 43-76218

[52] U.S. Cl............... 106/46, 106/39.5, 106/73.33, 106/73.4, 106/65
[51] Int. Cl............................................. C04b 33/26
[58] Field of Search..... 106/46, 45, 39, 65, 73.4, 42

[56] References Cited
UNITED STATES PATENTS
3,442,667  5/1969  Berghezan ........................ 106/65 X
1,775,867  9/1930  Sandmeier ........................... 106/42
2,427,454  9/1947  Heany.................................. 106/42
3,345,596  10/1967  Delaney et al.................. 252/518 X
3,446,669  5/1969  Arrance et al..................... 106/65 X
2,152,656  4/1939  McDougal et al................ 106/46 X
1,633,462  6/1927  Sortwell.............................. 106/46
2,413,441  12/1946  Feichter........................... 106/46 X
3,291,619  12/1966  Luks.................................. 106/46
2,982,664  5/1961  Luks.................................. 106/65 X Primary Examiner—Helen M. McCarthy
Attorney, Agent, or Firm—Christensen, O'Connor, Garrison & Havelka

[57] ABSTRACT

A colored ceramic body for use in various parts of electronic equipment, comprising at least one of $Al_2O_3$ and $BeO$ as a basic component, 0.1 to 5 percent by weight $CoO$ and further additive chosen from the group consisting of $MnO_2$, $Cr_2O_3$, $V_2O_5$, $Fe_2O_3$ and mixtures thereof, the total amount of $CoO$ and further additive being 1.0 to 10 percent by weight. The ceramic body is dark in color and has excellent electrical, mechanical and thermal characteristics, and maintains an acceptably high volume resistivity even after the body has been heated in a reducing atmosphere.

5 Claims, No Drawings

CERAMIC COMPOSITION

CROSS-REFERENCE TO RELATED APPLICATION

This application is a continuation-in-part of U. S. Ser. No. 864,178, filed Oct. 6, 1969, now abandoned, entitled CERAMIC COMPOSITION, inventor, Masatoshi Sugiura et al.

This invention relates to a colored ceramic body for use in various parts of electronic equipment.

It is required that ceramic material used in various electronic parts such as semi-conductor IC packages, transistor headers, etc. should have good electrical insulation characteristic, high mechanical strength and high thermal conductivity. Alumina and beryllia are known as the substances that meet the above requirements and have been shown in the literature and by examples below to be equivalent and interchangeable.

In some applications of the ceramic material, it is further required that they should also have a high degree of heat emissivity so that a large amount of heat may not be stored in the ceramic body, and that the ceramic body should be opaque so that no light is transmitted therethrough. To meet the requirements, it is common practice to color the ceramic body to black or near-black by adding thereto suitable metal oxides as coloring agents.

In electronics, the ceramic bodies are usually sealed to metals. In such a case, the surface of the ceramic body is first metallized and then adhered to the metal by means of brazing. In the metallizing and brazing processes, it is required that the processes should be carried out in a reducing atmosphere in order to prevent the oxidization of the metal. As mentioned above, however, the ceramic body contains various metal oxides as coloring agents, so that in the reducing atmosphere the oxides are reduced, thereby deteriorating the volume resistivity and thereby the insulating property of the ceramic body. Heretofore, such deterioration has been considered inevitable and the problem has been left unsolved.

Accordingly, the primary object of the invention is to provide a colored ceramic body for use in various electronic parts, which has excellent electrical, mechanical and thermal characteristics, and in which the volume resistivity is not deteriorated when the ceramic body has been treated in a reducing atmosphere.

Another object of the invention is to provide a colored ceramic body for use in various electronic parts, which comprises at least one of alumina and beryllia as a basic component, an essential additive of cobalt oxide 0.1 to 5.0 percent by weight (the percentages throughout the specification and claims will be by weight), and a further additive consisting of at least one of manganese oxide 0.1 to 5.0 percent, chrome oxide 0.1 to 5.0 percent, vanadium oxide 0.1 to 2.0 percent and iron oxide 0.1 to 2.0 percent, the total of CoO and further additive being 1.0 to 10 percent by weight, said materials being sintered.

The ceramic products obtained in accordance with the invention are all dark in color such as brown or dark brown, which colors are satisfactory in practical use, and have a relatively high volume resistivity of $10^{10}$ to $10^{13}$ ohm/cm, which value can be substantially retained even after the products have been exposed to a reducing atmosphere.

It should be noted that if the above-stated metal oxides are added in an amount exceeding the above specified ranges of percentage, the electrical, mechanical and thermal characteristics inherent in alumina and/or beryllia are deteriorated, while if they are added in an amount less than the specified ranges, sufficient coloration cannot be accomplished.

The reason why the ceramic body composed in accordance with the invention can retain its excellent resistivity even after it has been treated in a reducing atmosphere is considered as follows: When the raw batch prepared in accordance with the invention are fired to the sintering temperature, the metal oxides including cobalt oxide 0.1 to 5.0 percent as an essential additive go into solid solution with the alumina, Beryllia or mixtures thereof with a considerable part of them forming a stable matrix phase in the ceramic body, which suppresses the reducing action. The co-existence of cobalt oxide and the mentioned other metal oxide or oxides helps promote the formation of the stable matrix phase. There results a ceramic having a volume resistivity which is not deteriorated when the ceramic is heated in a reducing atmosphere.

To put it in more detail, when the raw batch, including alumina and/or beryllia as the principal components with an essential additive of 0.1 to 5.0 percent by weight CoO with other metal oxide coloring agents in the amounts as defined in the appended claims, the metal oxides go into solid solution with the alumina and/or beryllia as stable oxides. It is well known in the art that the oxygen atoms in a solid solution are far less likely to be reduced than free oxygen atoms in the matrix of a ceramic material. Thus, the ceramics of this invention are much less prone to lose oxygen atoms by reduction in a heated reducing atmosphere and thereby become semi-conductive. The present invention defines the relative percentage ranges of the components which accomplishes the desired result. If the ranges of the listed constituents are not observed it is theorized that the excess metal oxides leave in the ceramic matrix free oxygen atoms which are more likely to be reduced, thereby rendering the ceramic semi-conductive and thereby deteriorating its electrical resistance. On the contrary, if the essential ingredient of CoO is absent with only the coloring agents well known in the prior art, no such stable solid solution matrix phase is formed. Such prior art ceramics readily lose oxygen atoms when heated in a reducing atmosphere thereby lowering the resistivity to an unacceptable level for use as an electronic component.

The invention will be further described with reference to some specific examples which are given for purposes of illustration only and are not to be taken in any way restricting the invention.

Table I below shows some examples composed in accordance with the invention in comparison with those in the prior art.

other oxides is 1.0 to 5.0 percent by weight and preferably 1.5 to 4.0. Sample numbers 10 and 11 clearly show the preferred composition ranges cited.

TABLE I

| COMPONENTS (%) | SAMPLE NO. | | | | | | | | | | |
|---|---|---|---|---|---|---|---|---|---|---|---|
| | 1 | 2 | 3 | 4 | 5 | 6 | 7 | 8 | 9 | 10 | 11 |
| $Al_2O_3$ | 96.0 | | 96.0 | 83.0 | 95.3 | 93.0 | 90.0 | 91.0 | 33.4 | 92.4 | 92.0 |
| BeO | | 97.0 | | 10.0 | | | | | 60.0 | | |
| CoO | | 0.3 | 0.5 | 3.0 | 0.4 | | 1.0 | 0.5 | 0.8 | 0.1 | 5.0 |
| $MnO_2$ | 1.0 | 0.7 | 0.5 | | 2.0 | 2.0 | 3.0 | 3.7 | 3.0 | 3.5 | 0.5 |
| $Cr_2O_3$ | | | 2.0 | | 2.0 | 2.0 | 1.0 | 2.1 | 1.0 | 2.5 | 1.0 |
| $V_2O_3$ | | | | | 0.3 | 0.5 | | 0.3 | 0.2 | | |
| $Fe_2O_3$ | 1.0 | 0.5 | 1.0 | 0.8 | | 2.5 | 2.0 | | 0.2 | | 1.5 |
| $SiO_2$ | | 0.5 | | 1.2 | | | | 0.4 | 0.3 | | |
| $TiO_2$ | 2.0 | | | | | | 1.0 | 2.0 | 0.7 | 1.5 | |
| MgO | | 1.0 | | 2.0 | | | | | | | |
| NiO | | | | | | | 1.0 | | 0.2 | | |
| CuO | | | | | | | 1.0 | | 0.2 | | |
| COLOR | dark brown | brown | blue black | dark blue | brownish black | brwnish blk. | blk. | blk. | dark brwn. | Blk. | dark blue |
| FIRING TIME (Hr.) | 2 | 2 | 2 | 2 | 2 | 2 | 2 | 2 | 2 | 2 | 2 |

The compositions shown in Table I are batch compositions using chemically pure inorganic materials which are commercially available. The resulting ceramic solid solution formed upon firing of these batch compositions were found to be substantially identical in composition to the batch composition utilized. If it is desired to use less pure inorganic materials it will be necessary to adjust the batch compositions to result in a final fired ceramic composition in the desired ranges. Best results will be obtained through usage of the chemically pure raw materials to avoid the introduction of undesirable impurities detrimental to the electrical properties of the resulting fired ceramic. By usage of pure raw materials batch compositions will be very closely equal to analyzed compositions of the fired product.

The total amount of the essential ingredient CoO in combination with other metal oxides is in the range of approximately 1.0 to 10 percent by weight and preferably is in the range of 1.5 to 9 percent. The preferred range of CoO is 0.1 to 3.0 percent by weight. The major constituent, $Al_2O_3$, BeO or mixtures thereof is present in the range of 85 to 99 percent and preferably 90 to 98.5 percent by weight.

When the amount of CoO is approximately 0.1 percent, the amount of the other metal oxides is in the range of 1.5 to 10 percent by weight and preferably is in the range of 2.0 to 9.0 percent. When the amount of CoO is in the range of 5.0 percent the amount of the Table II below shows the firing temperatures at which the samples were sintered, the volume resistivity of the samples after the sintering, the temperatures at which the ceramic bodies were heated for 2 hours in a reducing atmosphere and their volume resistivity after the heat treatment. In this table, the temperatures are given in centigrades and the resistivity is in ohm/cm measured at 200°C.

TABLE II

| Sample No. | Firing (Oxidizing Atmosphere) | | Reducing Atmosphere | |
|---|---|---|---|---|
| | Firing Temp. | Volume Resistivity | Heating Temp. | Volume Resistivity |
| 1 | 1640 | $10^{12}$ | 1400 | $10^8$ |
| 2 | 1650 | $10^{13}$ | 1400 | $10^{13}$ |
| 3 | 1620 | $10^{12}$ | 1430 | $10^{12}$ |
| 4 | 1620 | $10^{12}$ | 1430 | $10^{12}$ |
| 5 | 1600 | $10^{11}$ | 1400 | $10^{11}$ |
| 6 | 1580 | $10^{11}$ | 1400 | $10^8$ |
| 7 | 1540 | $10^{13}$ | 1400 | $10^9$ |
| 8 | 1350 | $10^{11}$ | 1250 | $10^{11}$ |
| 9 | 1470 | $10^{12}$ | 1300 | $10^{12}$ |
| 10 | 1450 | $10^{11}$ | 1250 | $10^{11}$ |
| 11 | 1600 | $10^{10}$ | 1400 | $10^{10}$ |

As is clearly seen from Tables I and II all the samples are dark color and in Sample No. 1 and No. 6 which do not contain any cobalt oxide (prior art compositions) the volume resistivities are $10^{12}$ and $10^{11}$ ohm/cm after the firing, but are greatly reduced to $10^8$ ohm/cm after they are further heated in a reducing atmosphere. Exceptionally, Sample No. 7 which contains a relatively large amount (3 percent in all) of titanium oxide, nickel oxide and copper oxide also has its volume resistivity greatly reduced by the treatment in the reducing atmosphere, whereas no such reduction of the volume resistivity has been observed in Sample Nos. 8 and 9 which contain a relatively small amount (less than 2.5 percent in all) of these compounds. Sample Nos. 2 to 5, 8, 9, 10 and 11 prepared in accordance with the invention retain their respective high volume resistivities substantially unchanged before and after the heat treatment in the reducing atmosphere.

The cobalt oxide not only serves to color the ceramic bodies but also helps prevent the reduction of the oxides in the reducing atmosphere. Therefore, the cobalt oxide is an essential component of the ceramic body of the invention. With respect to the other metal oxides serving as a coloring agent, that is, the oxides of manganese, chromium, vanadium, iron, titanium, nickel and copper, generally the presence of the coloring agents other than the chrome oxide is likely to promote crystal growth in the ceramic body, thereby deteriorating the electrical and mechanical properties of the sintered ceramic body, that is reducing the mechanical strength and the electrical resistance. The chrome oxide is effective in suppressing the crystal growth and therefore is preferably added in addition to the cobalt oxide. The oxides of manganese, vanadium, iron, titanium, and copper are effective in promoting sintering and may be added in a suitable amount depending on specific sintering conditions. However, if the oxides of titanium, copper or nickel are added in a large amount, they will cause the reduction of the resistivity of the ceramic body, because those oxides are apt to be reduced especially by the heat treatment in the reducing atmosphere. Therefore, the total amount of these oxides to be added must not exceed about 2.5 percent.

Titanium oxide alone is white or yellow in color in an oxidizing atmosphere and therefore cannot be used as a coloring agent. However, if it coexists with manganese oxide or iron oxide, it helps color the ceramic body to the dark colors.

It should be noted that besides the above-mentioned coloring agents, MgO, CaO, $ZrO_2$, or other mineralizers, which are non-coloring agents, may also be added in small quantities so long as they do not adversely affect the effects of the invention. Impurities such as alkali metal oxides may exist in the ceramic body. Of course, the impurities must be minimized.

What we claim is:

1. A fired ceramic body having a bulk resistivity in the range of $10^{10}$ to $10^{13}$ ohm/cm at 200°C., said bulk resistivity being relatively unaffected by exposure of said ceramic to reducing atmospheres at elevated temperatures consisting essentially of at least 90 percent by weight of an oxide chosen from the group consisting of $Al_2O_3$, BeO and mixtures thereof combined in solid solution with 0.1 to 5.0 percent by weight CoO and a component chosen from the group consisting of at least one of 0.1 to 5.0 percent $MnO_2$, 0.1 to 5.0 percent $Cr_2O_3$, 0.1 to 2.0 percent $V_2O_5$ and 0.1 to 5.0 percent $Fe_2O_3$, the total amount of CoO and said component being 1.0 to 10 percent by weight, said body being colored and opaque to light.

2. The ceramic body of claim 1 wherein CoO is present in the amount of 0.1 to 3.0 percent by weight.

3. The ceramic body of claim 1 consisting essentially of approximately 97.0 percent by weight BeO, 0.3 percent by weight CoO, 0.7 percent by weight $MnO_2$, 0.5 percent by weight $Fe_2O_3$, 0.5 percent by weight $SiO_2$ and 1.0 percent by weight MgO.

4. The ceramic body of claim 1 consisting essentially of approximately 95.3 percent by weight $Al_2O_3$, 0.4 percent by weight CoO, 2.0 percent by weight $MnO_2$, 2.0 percent by weight $Cr_2O_3$ and 0.3 percent by weight $V_2O_5$.

5. The ceramic body of claim 1 consisting essentially of approximately 91.0 percent by weight $Al_2O_3$, 0.5 percent by weight CoO, 3.7 percent by weight $MnO_2$, 2.1 percent by weight $Cr_2O_3$, 0.3 percent by weight $V_2O_5$, 0.4 percent by weight $SiO_2$, and 2.0 percent by weight $TiO_2$.

* * * * *